US006832353B2

(12) United States Patent
Itavaara et al.

(10) Patent No.: US 6,832,353 B2
(45) Date of Patent: Dec. 14, 2004

(54) VIEWING WEB PAGES ON SMALL SCREEN DEVICES USING A KEYPAD FOR NAVIGATION

(75) Inventors: Jaakko Itavaara, Lexington, MA (US); Semi Malinen, Cambridge, MA (US); Pasi Nieminen, Lawrence, MA (US); Bhavin Suthar, Woburn, MA (US); Honglang Zhang, North Andover, MA (US)

(73) Assignee: Nokia Mobile Phones, Ltd., Espoo (FI)

( * ) Notice: Subject to any disclaimer, the term of this patent is extended or adjusted under 35 U.S.C. 154(b) by 408 days.

(21) Appl. No.: 09/876,070

(22) Filed: Jun. 8, 2001

(65) Prior Publication Data

US 2002/0186262 A1 Dec. 12, 2002

(51) Int. Cl.[7] ................................................. G09G 5/00
(52) U.S. Cl. ...................... 715/744; 715/864; 715/738; 715/736; 715/737; 715/853; 715/854
(58) Field of Search ................................ 455/456, 517, 455/566; 345/737, 738, 736, 744, 853, 854, 864; 707/517, 513

(56) References Cited

U.S. PATENT DOCUMENTS

| | | | |
|---|---|---|---|
| 6,101,498 A | | 8/2000 | Scaer et al. |
| 6,138,158 A | | 10/2000 | Boyle et al. |
| 6,300,947 B1 | * | 10/2001 | Kanevsky .................... 345/866 |
| 6,593,944 B1 | * | 7/2003 | Nicolas et al. .............. 345/744 |
| 6,731,316 B2 | * | 5/2004 | Herigstad et al. ........... 345/864 |
| 2001/0054049 A1 | * | 12/2001 | Maeda et al. ............... 707/517 |
| 2002/0032035 A1 | | 3/2002 | Teshima |

OTHER PUBLICATIONS

Palm VII Handheld Technology, "Wireless Internet Access Comes To The Palm Computing Platform", 1998, 14 pages.

* cited by examiner

*Primary Examiner*—Ba Huynh
*Assistant Examiner*—Mylinh T Tran
(74) *Attorney, Agent, or Firm*—Banner & Witcoff, Ltd.

(57) ABSTRACT

A method and system for browsing and navigating web pages on a small screen device using a keypad are disclosed. A web page is divided into logical sections. In one embodiment, each section is mapped to at least one key on a keypad, such that when a user presses a key, the corresponding section of the web page is displayed on the device's display panel. In another embodiment, each section is mapped to a symbol which can be remembered by the user. The user then selects the symbol corresponding to the section of the web page that he or she desires to view. As each section of the web page is being viewed, an icon may be included on the screen to indicate that portion of the web page that is being viewed.

22 Claims, 4 Drawing Sheets

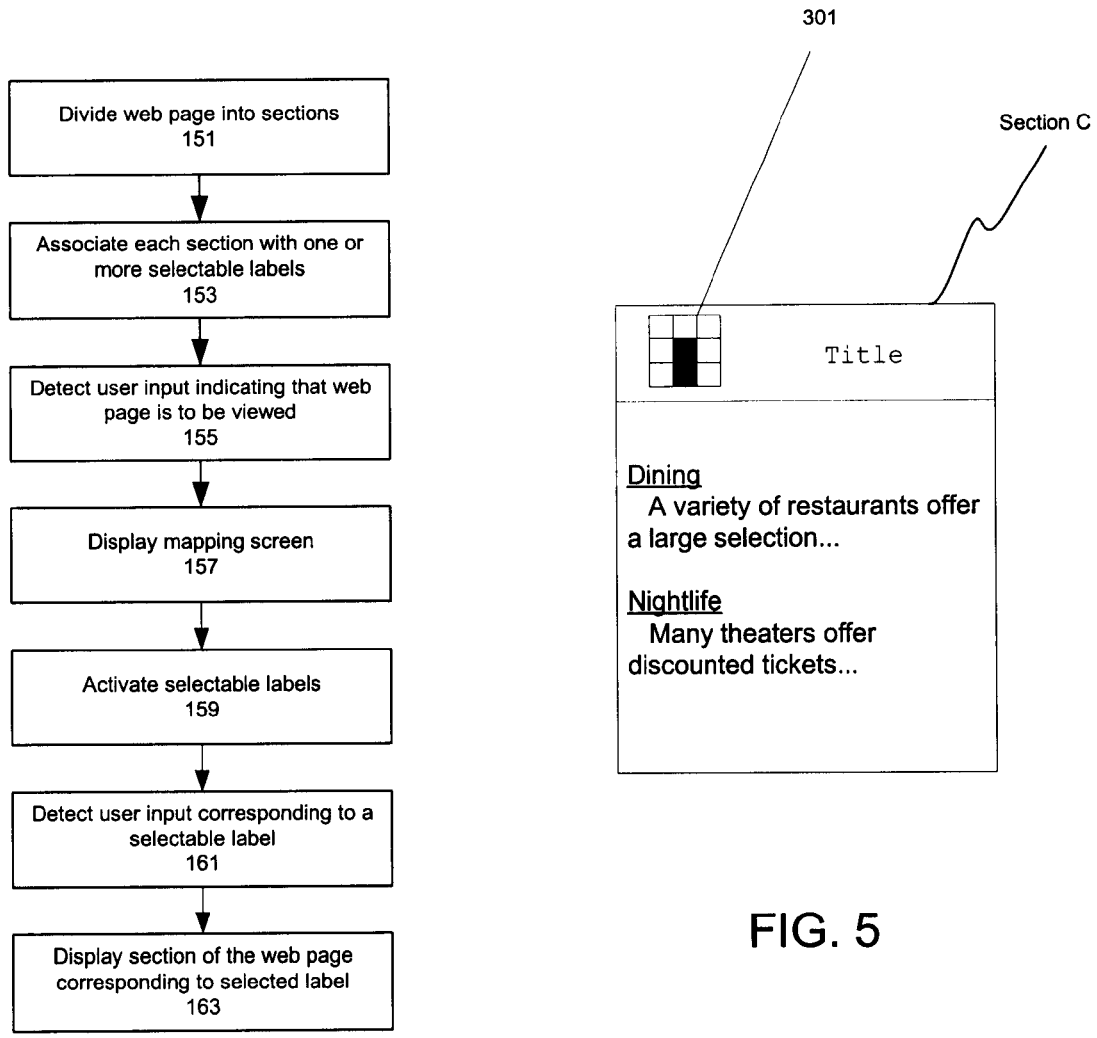
FIG. 5
FIG. 4
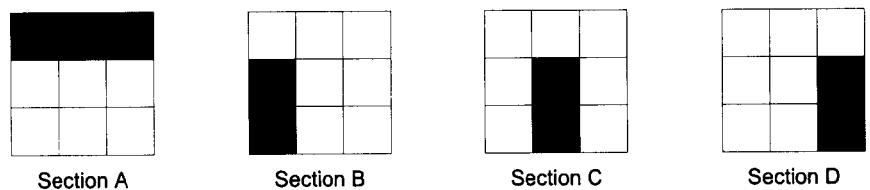
FIG. 6

VIEWING WEB PAGES ON SMALL SCREEN DEVICES USING A KEYPAD FOR NAVIGATION

FIELD OF THE INVENTION

The invention relates to the display of web pages. More particularly, the invention provides a method and system for viewing web pages on a small screen device using a keypad for navigation.

BACKGROUND OF THE INVENTION

Web pages are typically designed for display on conventional computer monitors (RGB, LCD, and the like) that range in size from 14" to 21" and higher. These conventional computer monitors generally provide screen resolutions of 600×400 and up, with most users setting their monitors to a resolution of 800×600 or 1024×768.

A problem arises when these web pages are displayed on devices with screens smaller than the web page's resolution, such as on a mobile telephone, personal digital assistant (PDA), or some other communications and/or computing device with a small screen. Due to the small size of the screen, a web page generally must either be shrunk down to fit the entire page on the smaller screen, or scroll bars must be used to move around the page. However, text and graphics may be lost or unreadable when the web page is shrunk to such a size that it would fit on the smaller screen, and manipulating scroll bars on a small screen is often difficult and creates user frustration.

One known way of dividing a web page into smaller units is by using frames, as are known in the art, that have been predefined within the web page. Each frame within a web page behaves similar to individual windows in that scrolling up and down or left and right within the frame does not scroll the content in other frames within the same web page. Frames have not been used to reduce the size of a web page for viewing on small screen devices.

Another known way of dividing a web page into smaller units is by using tables, also known in the art. Tables have not be used to reduce the size of a web page for viewing on small screen devices.

One method of preparing web pages for viewing on small screen devices is known as "web clipping," developed by Palm, Inc. of Santa Clara, Calif. Web clipping has been analogized to clipping relevant articles out of a newspaper such that a user only receives relevant information. Web clipping uses a query (a Palm query application, or PQA), to retrieve specific information meeting predefined criteria from the Internet, and transmits the retrieved data to the user's handheld device. Web clipping, however, prohibits the user from receiving information that may otherwise be retrieved if the user views entire web pages instead of "clipped" web pages.

In recent years services have begun offering web page content specifically designed for small screen devices, such as PDAs. These web pages generally have smaller sizes, demand less screen color and resolution capabilities, and are not graphic intensive. AVANTGO, by AvantGo, Inc. of Hayward, Calif., is an example of such a service.

While these smaller web pages are easier to display on small screen devices, there is still a problem navigating around these web pages on small screen devices. While PDAs typically allow a user to navigate in a point-and-click fashion using a stylus, other small screen devices, such as mobile telephones, typically do not offer such a feature. Instead, they rely on awkward and non-intuitive keystrokes on a keypad to navigate through a web page and its associated links. Another problem is that these web pages typically do not include as much information as a more conventionally sized web page.

Some mobile telephones offer mini-browser applications with which users can navigate web pages. However, current implementations do not support switching between different sections of a web page, nor do current implementations support visualization of different sections of a web page. Thus, presently known mini-browsers do not optimize web page navigation capabilities on small screen devices Thus, it would be an advancement in the art to develop an improved method and system that can display a web page on a small screen device, and allow a user to logically navigate the web page and its associated links.

It would also be an advancement in the art to develop an improved method and system that can be used for navigating web pages on small screen devices that rely on a keypad for navigation.

SUMMARY OF THE INVENTION

In a first embodiment of the invention, there is a method for displaying a web page that has been divided into sections, where each section is associated with at least one of a plurality of selectable labels. The method includes receiving user input corresponding to a selected label, and displaying on a screen the section of the web page associated with the selected label.

In a second embodiment of the invention, there is a mobile terminal for displaying web pages. The mobile terminal includes a display, a keypad, a processor, and a memory for storing computer readable instruction that, when executed by the processor, cause the device to perform a set of steps. The mobile terminal receives user input corresponding to a selected label, and displays on the screen a section of the web page associated with the selected label, where the web page has been divided into sections and each section has been associated with at least one of a plurality of labels.

In a third embodiment, there is a mobile terminal that has a display, a keypad, a processor, and a memory for storing computer readable instruction that, when executed by the processor, cause the device to perform a set of steps. The mobile terminal stores in the memory a web page that has been divided into sections, and stores association information in the memory. The association information includes an association of each section of the web page with at least one corresponding key on the keypad. The mobile terminal displays a mapping screen on the display, and receives user input corresponding to a selected key on the keypad. In response to receiving the user input, the mobile terminal displays on the display a section of the web page associated with the selected key.

In a fourth embodiment of the invention, there is a method for displaying web pages on a device, including the steps of storing in a memory a web page, wherein the web page has been divided into sections; storing association information in the memory, wherein the information includes an association of each section of the web page with at least one corresponding key on the keypad; displaying a mapping screen on a display; receiving user input corresponding to a selected key; and displaying on the display a section of the web page associated with the selected key.

In some embodiments, the labels may be icons displayed on the screen.

In other embodiments, the labels may be keys on a device keypad.

BRIEF DESCRIPTION OF THE DRAWINGS

FIG. 4 shows a flowchart of a method of performing an embodiment of the invention.

FIG. 5 shows a portion of a web page displayed on a small screen device with an icon 301 indicating the portion of the web page displayed.

FIG. 6 shows icons that may be used to represent various portions of a web page.

DETAILED DESCRIPTION OF THE INVENTION

The invention may be embodied in a method and system for navigating web pages on a small screen device, as herein described with respect to FIGS. 1–12. Web pages may include any file that may be viewed over the Internet using a browser. These files include those created using HTML, XML, WAP, PQA, ASP, CGI, Java, JavaScript, and any other programming language or protocol that may be used to create and/or serve web pages over the Internet or another network.

Figure 1:
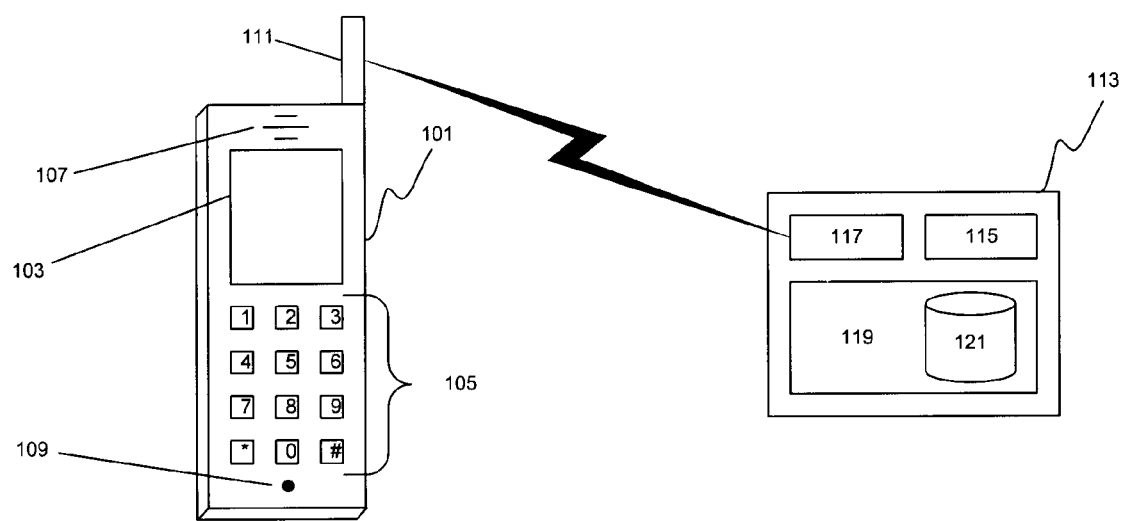
FIG. 1 shows a mobile telephone for use in an embodiment of the invention.
Figure 2:
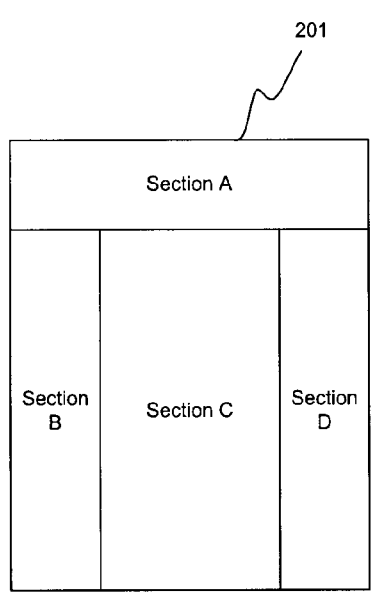
FIG. 2 shows a web page divided into sections for use in an embodiment of the invention.

In one embodiment, the invention may be used in a mobile telephone or terminal 101, shown in FIG. 1, or any other device with a display and a keypad that may be used to view web pages. Some embodiments may also be used with devices utilizing a stylus or other pen-input device. The mobile telephone 101 has a display 103, keypad 105, speaker 107, microphone 109, and communications antenna 111. A user may use the keypad 105 to navigate/browse a web page 201, shown in FIG. 2. The mobile telephone may also include a processor and a memory (not shown), as is known in the art. The memory may be used to store computer readable instructions that, when executed by the processor, cause the mobile telephone to perform in accordance with the invention.

The mobile telephone 101 may be communicatively linked to a server 113 through which web pages are served to the mobile telephone. The server 113 may have a processor 115, communications equipment 117, and memory 119. The memory may store a database 121 containing web pages for serving to the mobile telephone 101. Alternatively, web pages may be stored on other web servers, as is known in the art, and the server 113 would retrieve a requested web page from another server on which it is located, and then serve the requested web page to the mobile telephone.

For use with the invention as described herein, each web page may be divided into sections. In the present example, web page 201 is divided into Sections A, B, C & D. Preferably, the sections are logical divisions of the web page, such as preexisting frames or tables within the web page, as are known in the art. Sections, however, are not required to correspond to frames when frames are present. Other bases for dividing a web page into sections include menu layouts on the web page, advertisements at the top and/or bottom of the page, lists of related hyperlinks, groups of text, etc. For example, In FIG. 2, Section A may correspond to an advertisement at the top of the web page. Section B may correspond to a menu on the left side of the web page. Section C may correspond to a main body of the web page, including text, links, etc., and Section D may correspond to a list of related web sites that may provide additional information to the user. One skilled in the art may easily envision other bases for dividing each web page.

Each section preferably is created so that it may easily be displayed on a small screen device. While each section, however, may be larger than the screen 103 of the device 101, each section should be able to be viewed easily, such as by scrolling, on the screen. The division of each web page into sections may be performed manually, such as by a page author, or automatically by a computer. The computer dividing the web page into sections may be the same device 101 that displays the page, or it may be a separate device, such as one that serves the web page to the device 101 for viewing. In one embodiment, where a computer other than the device 101 divides the web page into sections, sections may be transmitted to the device 101 as a user requests them. In another embodiment, the entire web page, i.e. all the sections, may be transmitted to the device at approximately the same time. However, in the present invention, how a web page is divided is secondary to how the web page is navigated after it has been divided.

Figure 3:
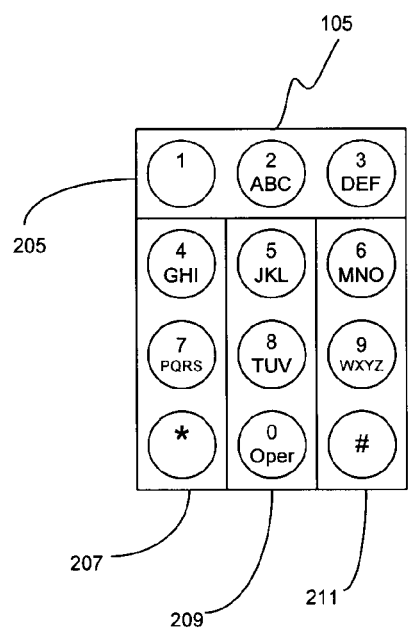
FIG. 3 shows an alphanumerical keypad divided into sections corresponding to the web page sections shown in FIG. 2.

After a web page 201 is divided into sections, each section is associated with one or more keys on a keypad, in this example with one or more of the keys 0–9, *, and # on the keypad 105. The sectional associations may be stored in the memory of device 101. FIG. 3 shows a set of key assignments that may be used with respect to the web page 201. In FIG. 3, a first set 205 of keys 1–3 is associated with Section A, a second set 207 of keys 4, 7 and * is associated with Section B, a third set 209 of keys 5, 8 and 0 is associated with Section C, and a fourth set 211 of keys 6, 9 and # is associated with section D.

In one embodiment, for instance where a computer serving web pages to the device 101 has information corresponding to the device's keypad, the server computer may perform the sectional associations and send information regarding the associations to the device. In another embodiment, for instance where the computer serving web pages to the device does not have information regarding the device's keypad 105, the device 101 may perform the sectional associations and store them in memory.

Figure 11:
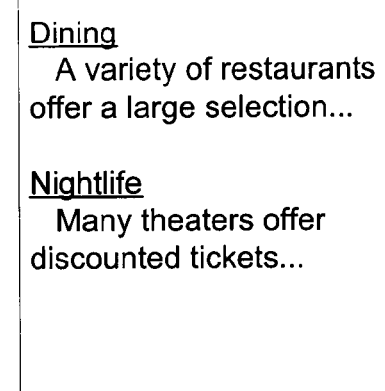
FIG. 11 shows a screen displaying a Main Body section of a web page according to an embodiment of the invention.

After the associations have been loaded and activated, when a user presses any key on the keypad, the corresponding section of the web page may be displayed on the device display 103. For example, as shown in FIG. 11, a user pressing key 5 may cause a main body of the web page, corresponding to Section C, to be displayed on the display

Figure 12:
FIG. 12 shows a screen displaying a Menu List section of a web page according to an embodiment of the invention.

103. Similarly, as shown in FIG. 12, a user pressing key 4 causes a menu list, corresponding to Section B, to be displayed on the display 103.

In one embodiment, where more than one key may be associated with the same section of a web page, and where that section may be larger than the size of the display 103, the section may be displayed with the top left corner of the section in the top left corner of the display, regardless of which associated key is pressed. For instance, in the above example, if Section A is wider than the display 103, the beginning of Section A is displayed on the display 103 regardless of whether key 1, 2 or 3 is pressed.

In another embodiment, also where more than one key may be associated with the same section of a web page, and where a section may be longer and/or wider than the display 103, sections may be further subdivided into subsections, such that a portion of the web page may be displayed corresponding to the subsection associated with the pressed key. For instance, in the above example, when a user presses key 4, the beginning of Section B may be displayed on the display device. However, when a user presses key 7, the middle portion of Section B may be displayed. In another embodiment, the first time a user presses key 7 the beginning portion of Section B may be displayed, and if the user again presses key 7 without having pressed any intervening keys, the middle portion of Section B may displayed on the device display 103. In this manner a user may easily navigate to a section and further to a subsection of a web page with a minimal amount of keystrokes.

With reference to FIG. 5, because only a portion of the web page may be shown at any given time, a graphic or icon 301 may be displayed on the device display to indicate to the user the portion of the web page that is being displayed. For instance, icon 301 may be an iconic depiction of a keypad with a portion of the keypad shaded to correspond to the displayed section. FIG. 5 shows Section C of web page 201 displayed on device display 103, including icon 301 indicating the specific section, i.e. Section C, of the web page 201 that is displayed. FIG. 6 shows icons that may be used for Sections A–D, respectively. While the icons in FIG. 6 resemble the keypad, each icon is principally designed to represent the displayed portion of the web page.

Figure 7:
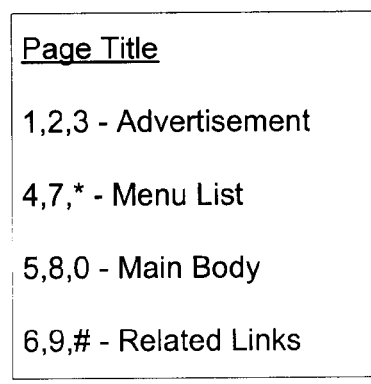
FIG. 7 shows a section-keys mapping screen for use in an embodiment of the invention.

When each web page is first displayed, the user may not know which keys are mapped to each section of the web page, nor may the user know the section divisions within the web page. With reference to FIG. 7, a mapping screen 311 may be displayed that informs the user of the key mappings to each section. The mapping screen may also include, as shown, a short description of each section's contents.

Each device 101 may be programmed such that the key mappings are only active when the user is browsing a web page and is not inputting information, e.g. into a web page form. Thus, when a user needs to use the keypad 105 for a conventional purpose, the key mappings will not interfere with such use. The device may activate the key mappings upon detecting that a user has either selected a hyperlink displayed on the display 103, or has selected activation of a browse mode. Upon entering browse mode, the device may display the user's home page in accordance with the invention as described above.

Figure 8:
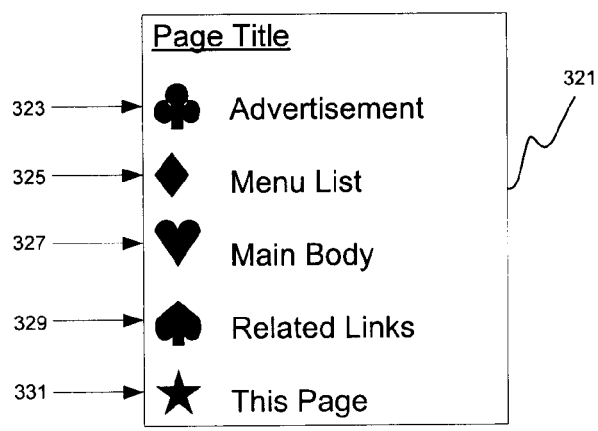
FIG. 8 shows a section-icon mapping screen for use in an embodiment of the invention.

In another embodiment, with reference to FIG. 8, each section of the web page may be associated with an icon instead of with a button on the keypad. Each icon is preferably one that can be easily remembered by a user. In this embodiment, a mapping screen 321 may initially be displayed that identifies the icons 323–329 associated with each section of the web page. The icons may be numbers, letters, or some other easily identifiable icon, such as the club, diamond, heart, or spade shown in FIG. 8. An additional icon 331 may be used to correspond to the mapping screen.

Figure 9:
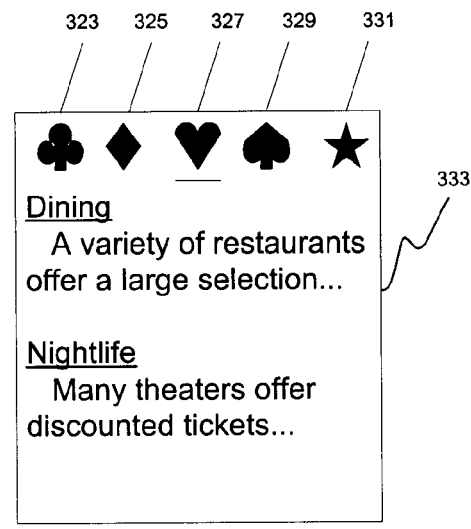
FIG. 9 shows a screen displaying a Main Body section of a web page according to an embodiment of the invention.

Upon viewing the mapping screen 321, a user may select one of the sections using any method, button, or other means known to one skilled in the art, such as through the use of special navigation buttons (not shown) on the device 101. When the user selects the section that he or she wants to view, the device displays the selected section's contents on the device display 103 in a section screen 331, as shown in FIG. 9. FIG. 9 shows section C, or the main body, of web page 201 displayed on the device display 103 according to this embodiment of the invention.

Figure 10:
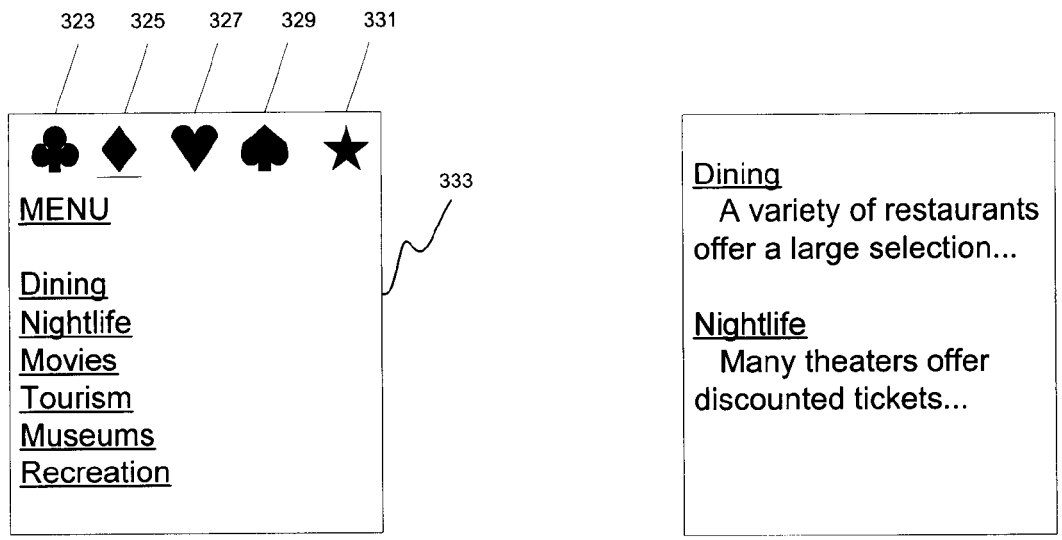
FIG. 10 shows a screen displaying a Menu List section of a web page according to an embodiment of the invention.

In addition to the contents of the selected section, the device may also display the icons 323–331 on the screen. By displaying the icons 323–331 on the screen, the user may directly select one of the icons associated with another section of the web page. Upon selecting a section icon, the device displays that section on the display 103. For example, if the user selects the diamond icon 325, the Menu List will be displayed. FIG. 10 shows a section screen 335 displaying the Menu List of the web page 201. The user may alternatively select the icon 331 associated with the mapping screen 321 in order to review the section-icon associations.

Optionally, on each section screen, the icon representing the displayed section may be highlighted, underlined, or displayed in some other way to indicate that the section corresponding to that symbol is presently being displayed. For example, in FIG. 9, the heart, which corresponds to the Main Body of the web page, is underlined to indicate that the Main Body of the web page is presently displayed, while in FIG. 10 the diamond is underlined to indicate that the Menu List is presently displayed.

A method for displaying a web page on small screen device will now be discussed with reference to FIG. 4. In step 151, the web page is divided into sections, as described above. This can be done manually or, where appropriate, automatically by computer. Each section is associated, in step 153, with one or more selectable labels. In one embodiment, the selectable labels are keys on the keypad 105. In this embodiment, the labels may be selected by pressing the associated key on the keypad. In another embodiment, the selectable labels may be icons or graphics on the display 103. In this embodiment, the labels may be selected by using known technologies, such as navigation buttons, a stylus, and the like, to select the icon on the display.

The small screen device, in step 155, detects user input indicating that a web page is to be viewed on the display 103. In response to the user input received in step 155, a mapping screen (as described above) is displayed in step 157 on the display 103. The selectable labels are activated in step 159. In the embodiment where the selectable labels are keys on the device keypad, activation comprises activating the section-key associations so that when a user presses a key on the keypad, the corresponding section of the web page is displayed. In the embodiment where the selectable labels are graphics or icons displayed on the display 103, activation comprises displaying the graphics or icons on the display 103 such that a user may select one of them in order to display a corresponding section of the web page. After the labels have been activated, the device waits for user input corresponding to a selected label, detected in step 161. In step 163 the device displays the section of the web page corresponding to the selected label.

Those skilled in the art will appreciate that the above-recited steps may be performed in other than the recited order, and that some steps may be optional. For instance, at least steps 157 and 159 may be reversed, and at least step 157 is optional.

The above-described method and system may be used to logically and efficiently navigate a web page on a small-screen device. The invention allows a user to quickly move from one section of a web page to another, while indicating the section which the user is presently viewing. The invention is not mutually exclusive of other forms of web page navigation, and may be used in conjunction with other forms of navigation. For instance, even when the selectable labels are active, hyperlinks on the displayed sections of the web page may be selected in a conventional manner using known technologies.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for displaying a web page that has been divided into a plurality of separately displayable sections on a small-screen device having a plurality of user-selectable elements and a display, the method comprising the steps of:

(i) receiving over a wireless communication channel, web page information and association information, wherein the association information associates each section of the web page to one or more selectable elements on the small-screen device;

(ii) storing in a memory of the small-screen device the web page and the information that associates each section to the one or more user-selectable elements;

(iii) detecting that a user of the small-screen device has selected one of the plurality of user-selectable elements;

(iv) in response to step (iii), displaying on the display the section associated with the one selected element; and (v) displaying an icon indicating which section of the web page is displayed.

2. A device comprising:

a display;

a keypad;

a processor; and a memory for storing computer readable instructions that, when executed by the processor, cause the mobile terminal to display a web page that has been divided into a plurality of separately displayable sections by performing the steps of:

(i) receiving over a wireless communication channel, web page information and association information, wherein the association information associates each section of the web page to one or more selectable elements on the mobile terminal;

(ii) storing in the memory the web page and the information that associates each section to the one or more user-selectable elements;

(iii) detecting that a user has selected one of the plurality of user-selectable elements;

(iv) in response to step (iii), displaying on the display the section associated with the one selected element; and (v) displaying an icon indicating which section of the web page is displayed.

3. A method for displaying a web page that has been divided into a plurality of sections on a small-screen device having a keypad and a display, the method comprising the steps of:

(i) mapping each of the plurality of sections of the web page to at least one button of a plurality of buttons on the keypad, based at least in part on a position of each section within the web page as compared to the position of the at least one button to which it is mapped within the keypad;

(ii) detecting that a user of the small-screen device has selected one of the plurality of buttons on the keypad; and (iii) in response to step (ii), displaying on the display the section of the web page mapped to the selected button.

4. The method of claim 3, wherein the keypad comprises a 12-key telephone keypad.

5. The method of claim 3, wherein each section corresponds to a frame within the web page.

6. The method of claim 3, wherein one of the sections corresponds to a table within the web page.

7. The method of claim 3, wherein one of the sections is mapped to at least two buttons on the keypad.

8. The method of claim 7, wherein step (i) comprises:

(a) identifying a predetermined number of subsections of the one section, the predetermined number of subsections corresponding to the number of buttons to which the one section is mapped; and (b) mapping each of the plurality of subsections of the one section to one of the buttons to which the one section is mapped, based at least in part on a position of each subsection within the one section as compared to the position of the buttons to which the one section is mapped, and wherein step (iii) comprises displaying on the display the subsection of the web page mapped to the selected button.

9. The method of claim 3, wherein step (iii) comprises displaying an icon indicating which section of the web page is presently displayed.

10. The method of claim 9, wherein the icon comprises a sectional representation of the web page.

11. The method of claim 3, further comprising, prior to step (ii):

(iv) displaying a mapping screen indicating to the user of the small-screen device the mappings between sections and buttons.

12. The method of claim 11, wherein step (iii) comprises displaying an icon indicating which section of the web page is presently displayed, and wherein the icon comprises a miniature representation of the mapping screen.

13. A device comprising:

a display;

a keypad comprising a plurality of buttons;

a processor; and a memory for storing computer readable instructions that, when executed by the processor, cause the mobile terminal to display a web page that has been divided into a plurality of sections by performing the steps of:

(i) mapping each of the plurality of sections of the web page to at least one button on the keypad, based at least in part on a position of each section within the web page as compared to the position of the at least one button to which it is mapped within the keypad;

(ii) detecting that a user of the small-screen device has selected one of the plurality of buttons on the keypad; and (iii) in response to step (ii), displaying on the display the section of the web page mapped to the selected button.

14. The device of claim 13, wherein the device comprises a mobile telephone and the keypad comprises a 12-key telephone keypad.

15. The device of claim 13, wherein each section corresponds to a frame within the web page.

16. The device of claim 13, wherein one of the sections corresponds to a table within the web page.

17. The device of claim 13, wherein one of the sections is mapped to at least two buttons on the keypad.

18. The device of claim 17, wherein step (i) comprises:

(a) identifying a predetermined number of subsections of the one section, the predetermined number of subsections corresponding to the number of buttons to which the one section is mapped; and (b) mapping each of the plurality of subsections of the one section to one of the buttons to which the one section is mapped, based at least in part on a position of each subsection within the one section as compared to the position of the buttons to which the one section is mapped, and wherein step (iii) comprises displaying on the display the subsection of the web page mapped to the selected button.

19. The device of claim 13, wherein step (iii) comprises displaying an icon indicating which section of the web page is presently displayed.

20. The device of claim 19, wherein the icon comprises a sectional representation of the web page.

21. The device of claim 13, wherein the computer readable instructions further comprise, prior to step (ii):

(iv) displaying a mapping screen indicating to the user of the small-screen device the mappings between sections and buttons.

22. The device of claim 21, wherein step (iii) comprises displaying an icon indicating which section of the web page is presently displayed, and wherein the icon comprises a miniature representation of the mapping screen.

\* \* \* \* \*

UNITED STATES PATENT AND TRADEMARK OFFICE
CERTIFICATE OF CORRECTION

PATENT NO. : 6,832,353 B2
DATED : December 14, 2004
INVENTOR(S) : Jaakka Itavaara et al.

It is certified that error appears in the above-identified patent and that said Letters Patent is hereby corrected as shown below:

Column 7,
Lines 27-28, 37, 39-40, 63 and 65, please replace "user-selectable elements;" with -- buttons; --.
Line 33, please replace "selectable elements;" with -- buttons; --.
Line 48, please replace "a keypad;" with -- a keypad having a plurality of buttons; --.
Line 59, please replace "selectable elements" with -- of the buttons --.
Line 60, please replace "mobile terminal;" with -- keypad; --.
Line 67, please replace "element;" with -- button; --.

Column 8,
Line 17, please replace "button." with -- and displaying an icon indicating which section of the web page is presently displayed. --.

Column 9,
Line 5, please replace "button." with -- button and displaying an icon indicating which section of the web page is presently displayed. --.

Signed and Sealed this

Sixth Day of September, 2005

JON W. DUDAS
*Director of the United States Patent and Trademark Office*